(12) United States Patent
Hull et al.

(10) Patent No.: US 7,173,184 B2
(45) Date of Patent: *Feb. 6, 2007

(54) ELECTRICAL OUTLET BOX WITH ALTERNATIVE MOUNTING FLANGES

(75) Inventors: Eric G. Hull, Madison, OH (US); Charles H. Riedy, Lakewood, OH (US); Dennis P. Revlock, Sr., Mēdina, OH (US)

(73) Assignee: The Lamson & Sessions Co., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/121,416

(22) Filed: May 4, 2005

(65) Prior Publication Data

US 2005/0199621 A1    Sep. 15, 2005

Related U.S. Application Data

(63) Continuation of application No. 10/680,630, filed on Oct. 7, 2003, now Pat. No. 6,914,187.

(51) Int. Cl.
*H01H 9/02* (2006.01)

(52) U.S. Cl. .............................. 174/58; 174/50; 174/63; 174/60; 248/906; 439/535; 220/3.2

(58) Field of Classification Search ................. 174/50, 174/58, 63, 135, 60, 57; 220/3.3, 3.2, 4.02; 248/906; 439/535
See application file for complete search history.

(56) References Cited

U.S. PATENT DOCUMENTS

| | | | |
|---|---|---|---|
| 982,841 A | 1/1911 | Maison | |
| 1,090,805 A | 3/1914 | Wagner | |
| 1,133,946 A | 3/1915 | Farrell | |
| 1,359,589 A | 11/1920 | Furthmann | |
| 1,454,722 A | 5/1923 | Boutin | |
| 1,796,037 A | 3/1931 | Mangin | |
| 1,857,787 A * | 5/1932 | Meeks et al. | 220/3.94 |
| 2,042,620 A | 6/1936 | Noyes | |
| 2,143,278 A | 1/1939 | Myers | |
| 3,863,037 A | 1/1975 | Schindler et al. | |
| 4,057,164 A | 11/1977 | Maier | |
| 4,612,412 A | 9/1986 | Johnston | |
| D286,768 S | 11/1986 | Borsh et al. | |
| 4,757,158 A | 7/1988 | Lentz | |
| 5,221,814 A | 6/1993 | Colbaugh et al. | |
| 5,286,040 A | 2/1994 | Gavin | |
| 5,646,371 A | 7/1997 | Fabian | |
| 5,833,110 A | 11/1998 | Chandler et al. | |
| 5,910,642 A | 6/1999 | Daoud | |
| 6,025,557 A | 2/2000 | Daoud | |
| 6,239,365 B1 | 5/2001 | McEvers | |
| 6,278,058 B1 | 8/2001 | Anderson | |
| 6,369,323 B1 * | 4/2002 | Wright | 174/51 |
| 6,395,981 B1 | 5/2002 | Ford et al. | |
| D462,664 S | 9/2002 | Roesch et al. | |
| 6,566,600 B1 | 5/2003 | Ford et al. | |
| 6,576,835 B1 | 6/2003 | Ford et al. | |

* cited by examiner

*Primary Examiner*—Dhiru R. Patel
(74) *Attorney, Agent, or Firm*—Jones Day

(57) ABSTRACT

An electrical outlet box having alternative mounting flanges on opposite sides thereof for selectively mounting the box to a front surface of a wall stud or to a side surface of a wall stud. The box and mounting flanges are configured for use of either mounting flange with the box located on either of opposite sides of the wall stud.

21 Claims, 4 Drawing Sheets

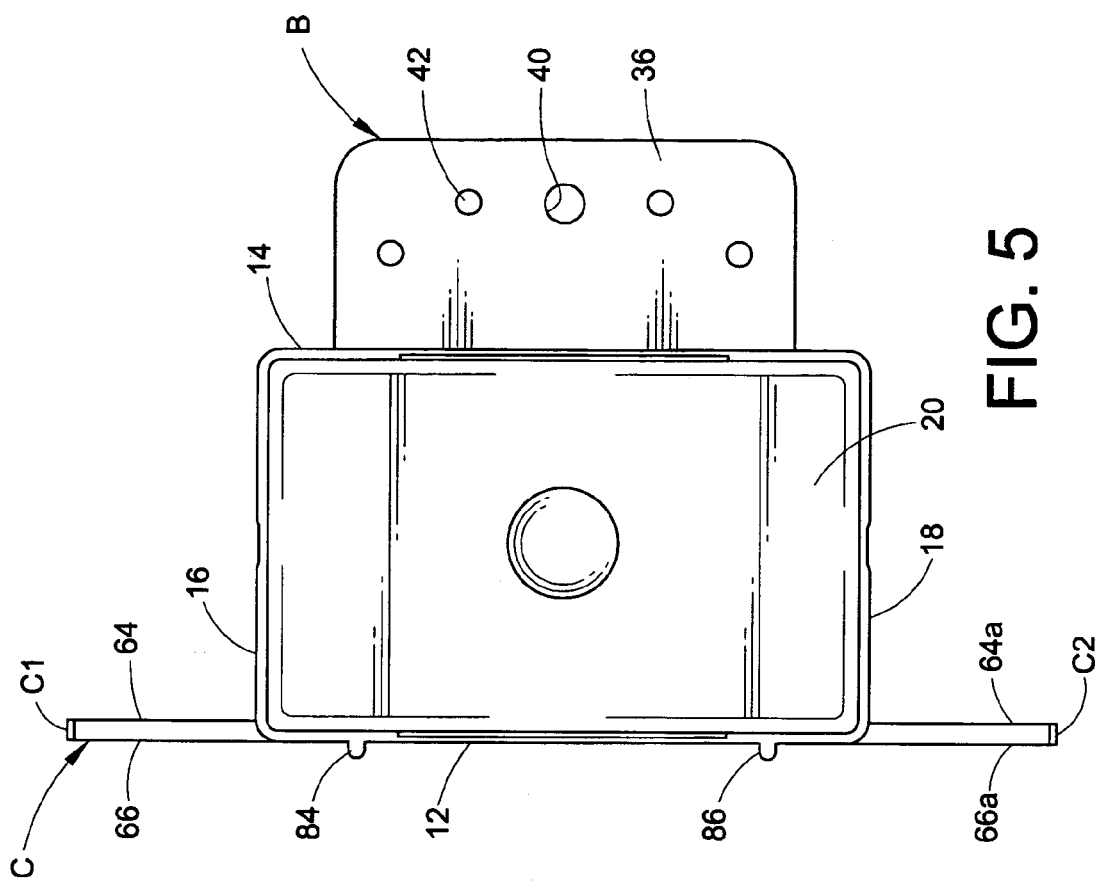
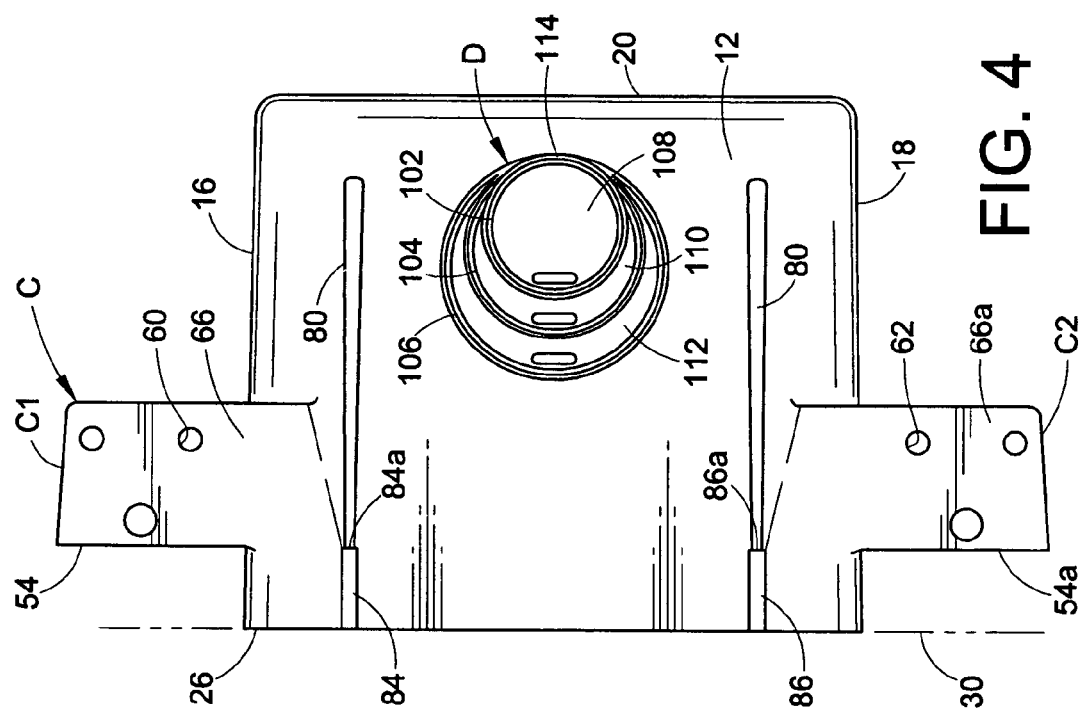

ELECTRICAL OUTLET BOX WITH ALTERNATIVE MOUNTING FLANGES

REFERENCE TO RELATED APPLICATION

This application is a continuation of U.S. Ser. No. 10/680,630 filed Oct. 7, 2003.

BACKGROUND OF THE INVENTION

This application relates to the art of electrical boxes and, more particularly, to electrical boxes that are molded in one-piece of plastic material with an integral mounting flange. The invention is particularly applicable to electrical outlet boxes that are mounted on vertical wall studs and will be described with specific reference thereto. However, it will be appreciated that the invention has broader aspects and can be used for other types of electrical boxes that are mounted to other types of supports.

Electrical outlet boxes commonly are molded in one-piece of plastic material with at least one integral mounting flange for mounting the box to a vertical wall stud. For some purposes, it is desirable to mount the box to a front surface of a wall stud, and for other purposes it is desirable to mount the box to a side surface of a wall stud. Existing arrangements for providing such alternative mounting of the same box are rather cumbersome. It would be desirable to have an improved arrangement that provides selective alternative mounting of an electrical outlet box to either the front surface or the side surface of a wall stud, and with the box positionable on either of opposite sides of the stud.

SUMMARY OF THE INVENTION

An electrical outlet box molded in one-piece of plastic material has alternative mounting flanges integrally molded therewith on opposite sides thereof. One mounting flange attaches the box to a front surface of a wall stud with the box located on either side of the stud. The other mounting flange attaches the box to a side surface of a stud with the box located on either of opposite sides of the stud.

The box has a front opening surrounded by a box front surface that lies in a front plane. One mounting flange extends outwardly from a box side wall parallel to the front plane and spaced rearwardly therefrom. The other mounting flange extends perpendicular to the front plane and is spaced rearwardly therefrom.

In accordance with another aspect of the mounting arrangement, the one mounting flange that extends generally parallel to the front plane is thinner than the mounting flange that extends generally perpendicular to the front plane. In addition, the mounting flange that extends generally parallel to the front plane has a width that is larger than the width of the other mounting flange that extends generally perpendicular to the front plane.

The mounting flange that extends generally perpendicular to the box front plane has a front surface that faces toward the front plane and is spaced a predetermined distance therefrom. The mounting flange that extends generally parallel to the box front plane has a rear surface that faces away from the box front plane and is spaced the same predetermined distance therefrom as the front surface of the mounting flange that extends generally perpendicular to the box front plane.

It is a principal object of the present invention to provide an improved electrical outlet box molded in one-piece of plastic material with integral alternative mounting flanges for mounting the box to either a front surface of a wall stud or to a side surface of a wall stud.

It is another object of the invention to provide an electrical box with alternative mounting flanges that are easy to use and do not interfere with one another.

BRIEF DESCRIPTION OF THE DRAWING

FIG. 4 is an elevational view of the opposite side thereof;

FIG. 5 is a rear elevational view thereof;

DESCRIPTION OF A PREFERRED EMBODIMENT

Figure 1:
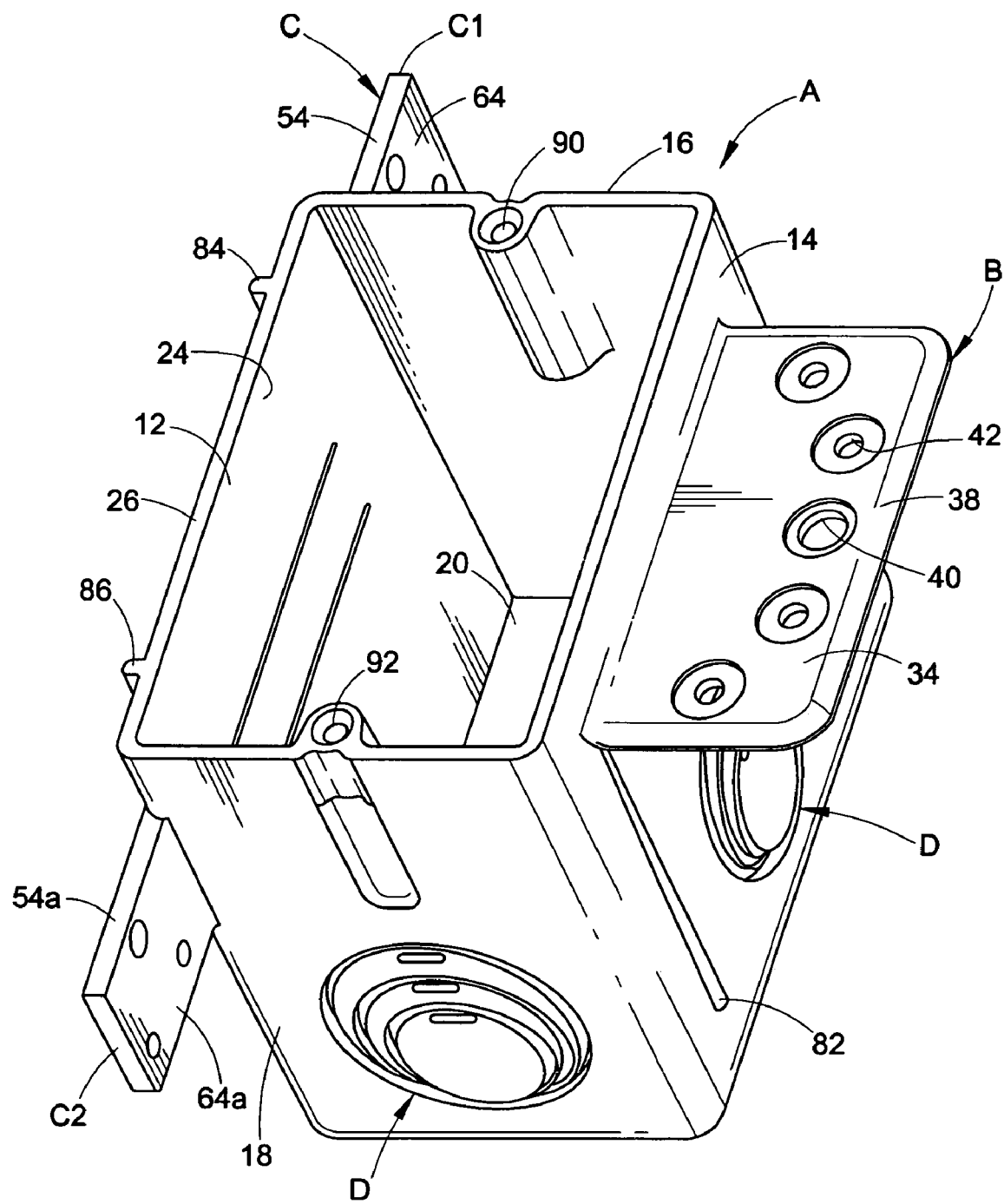
FIG. 1 is a perspective illustration of an electrical outlet box in accordance with the present application.

Referring now to the drawing, wherein the showings are for purposes of illustrating a preferred embodiment of the invention only and not for purposes of limiting same, FIG. 1 shows an electrical outlet box A molded in one-piece of plastic material such as, but not necessarily limited to, polycarbonate or polyvinylcholoride, the latter also being known as PVC. Although a single gang outlet box is illustrated in the drawings, it will be appreciated that the improved mounting arrangement of the present application applies equally to two-gang outlet boxes as well as to electrical boxes of other types.

Figure 3:
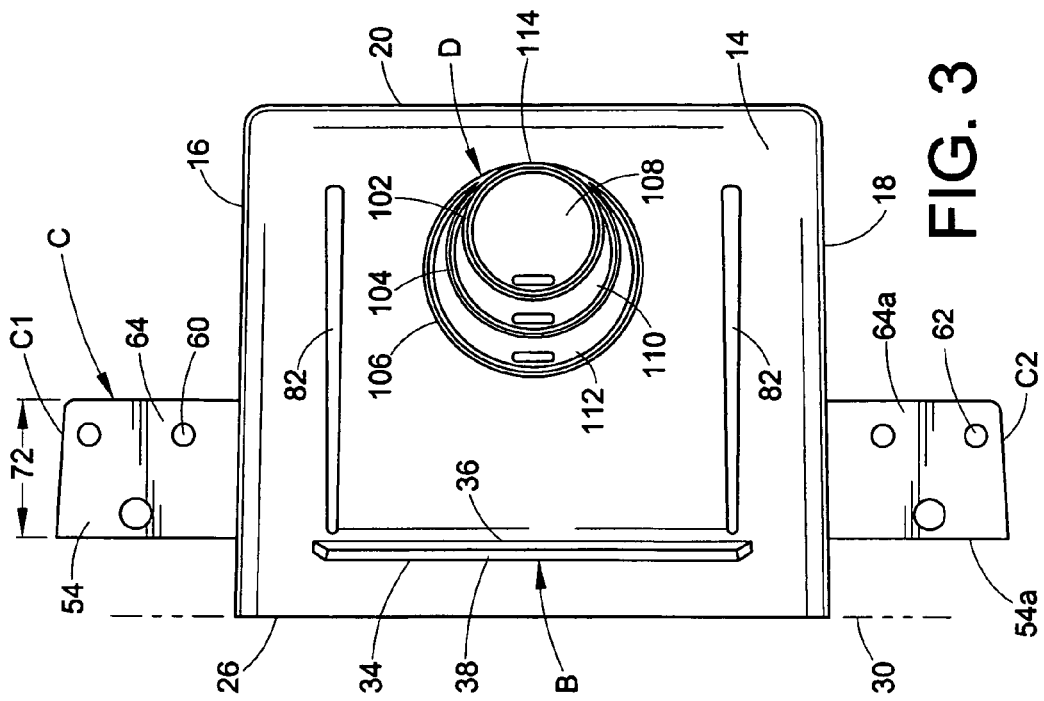
FIG. 3 is an elevational view of one side thereof.

Box A has opposite sidewalls 12 and 14, top and bottom walls 16 and 18, and a rear wall 20. A rectangular front opening 24 opposite from bottom wall 20 is surrounded by a box front surface 26 that lies in a plane that is represented by shadow line 30 in FIGS. 3, 4 and 6. Box A may be rotated 180° so that top wall 16 becomes the bottom wall and bottom wall 18 becomes the top wall. A first mounting flange B extends outwardly from sidewall 14 generally parallel to front plane 30 and spaced rearwardly therefrom. First mounting flange B has plane and parallel front and rear surfaces 34 and 36.

The outer peripheral portion of front surface 34 slopes toward rear surface 36 as generally indicated at 38. A plurality of countersunk fastener receiving holes extend through flange B perpendicular thereto and only two of such holes are generally indicated by numbers 40 and 42. The countersunk portions extend into front surface 34 around the fastener receiving holes.

Figure 2:
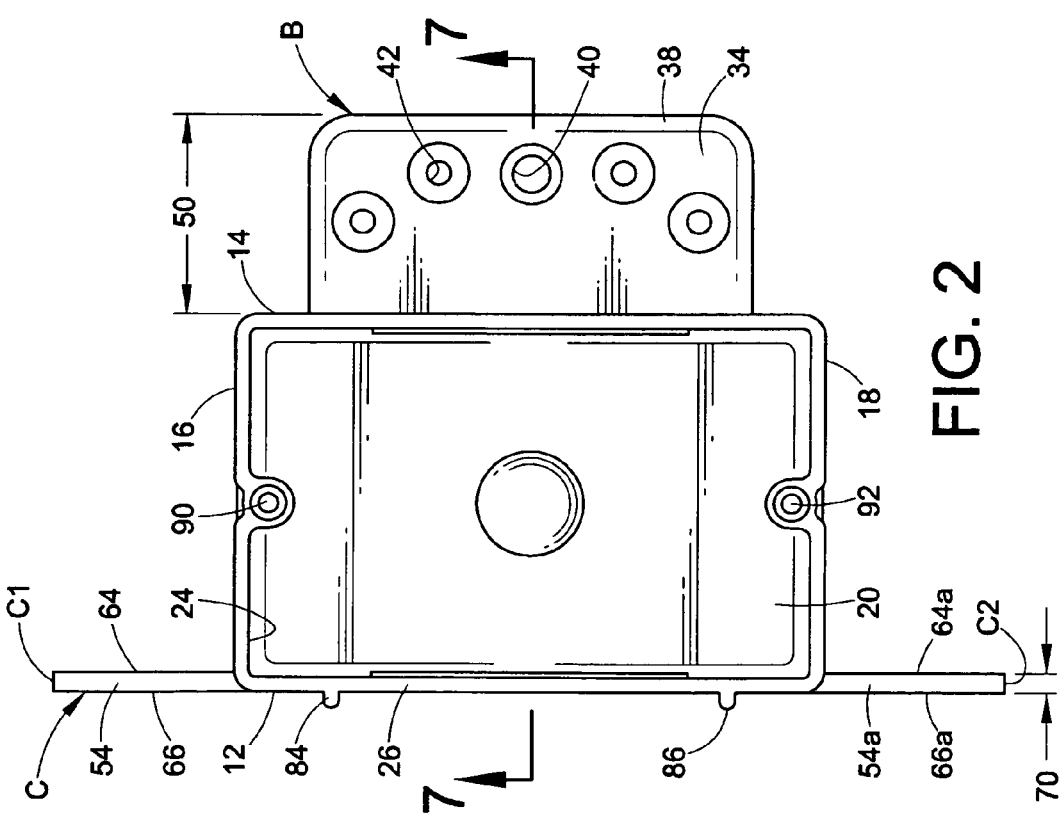
FIG. 2 is a front elevational view thereof.
Figure 6:
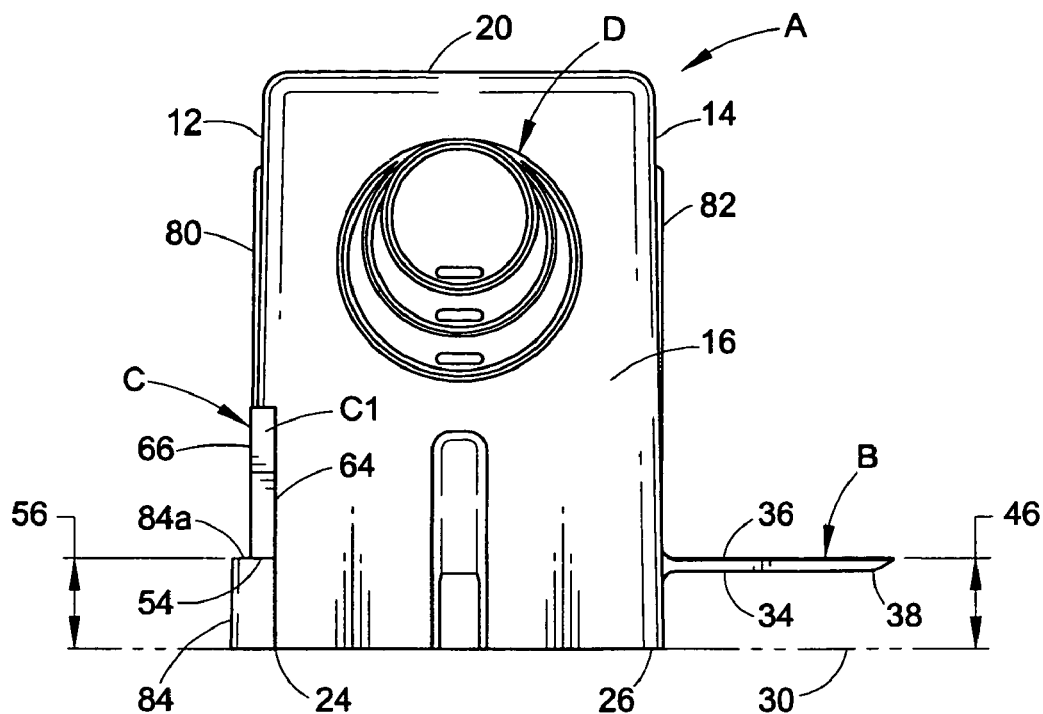
FIG. 6 is a top plan view thereof.
Figure 7:
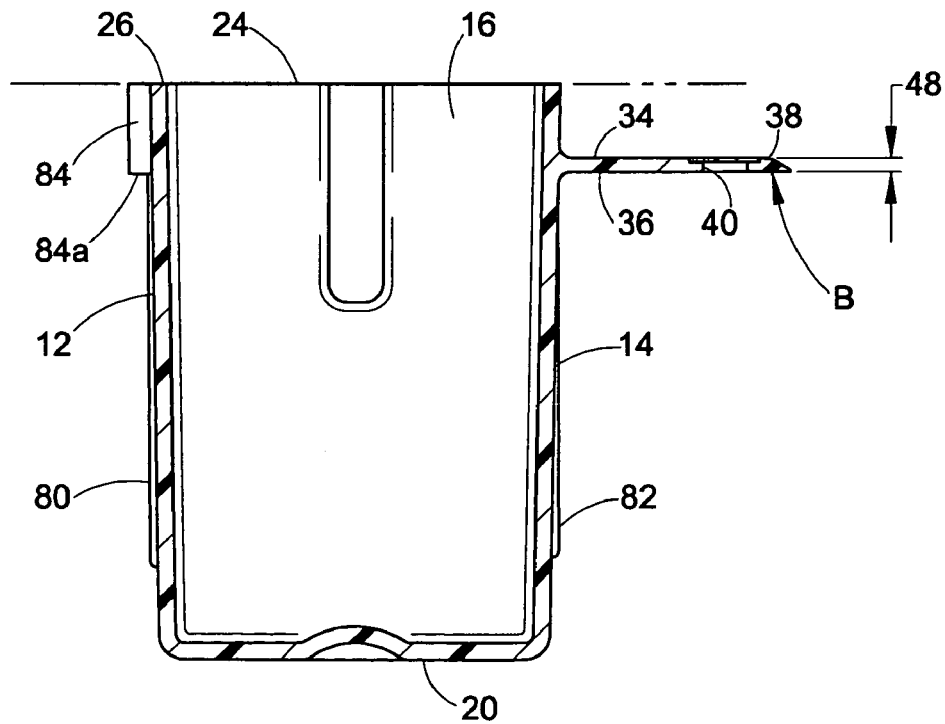
FIG. 7 is a cross-sectional elevational view taken generally on line 7—7 of FIG. 2.

Rear surface 36 of first mounting flange B is spaced toward box bottom wall 20 from front plane 30 a distance 46 as shown in FIG. 6, and flange B has a thickness 48 in FIG. 7 between front and rear surfaces 34, 36. Flange B is generally rectangular as clearly shown in FIGS. 1, 2 and 5, and has a generally uniform thickness throughout its area except for tapered peripheral portion 38. First flange B has a width 50 indicated in FIG. 2 in a direction outwardly from box sidewall 14.

A second mounting flange C includes mounting flange portions C1 and C2 extending outwardly from top wall 16 and bottom wall 18 in general alignment with sidewall 12. Mounting flange C extends generally perpendicular to front plane 30 and has a front surface 54, 54a that extends generally parallel to front plane 30 and is spaced rearwardly therefrom a distance 56 as shown in FIG. 6. Spacing 46 from front plane 30 to rear surface 36 of mounting flange B is approximately the same as spacing 56 from front plane 30 to front surface 54 of second mounting flange C. Mounting flange C has a plurality of spaced-apart fastener receiving holes therethrough and only two of such holes are generally indicated by numbers 60, 62.

Flange C has parallel inner and outer surfaces 64, 66 and 64a, 66a. Outer surfaces 66 and 66a lie generally in the same plane as the outer surface of box sidewall 12. The thickness of mounting flange C between inner and outer surfaces 64, 66 thereof is generally indicated at 70 in FIG. 2. Flange C also has a width generally perpendicular to front plane 30 as generally indicated at 72 in FIG. 3.

Thickness 70 of second mounting flange C is greater than thickness 48 of first mounting flange B. By way of example, thickness 70 may be around 0.12 inch while thickness 48 is around 0.078 inch. Thus, flange C has a thickness in a direction parallel to front plane 30 that is about 54% greater than the thickness of flange B in a direction perpendicular to front plane 30. In general, the thickness of second mounting flange C may be about 25% greater than the thickness of first mounting flange B, and more preferably is more than 40% greater.

The width 72 of second mounting flange C perpendicular to front plane 30 is smaller than the width 50 of first mounting flange B in a direction parallel to front plane 30. By way of example, width 72 of flange C may be around 0.88 inch while width 50 of flange B outwardly from the outer surface of sidewall 14 in a direction parallel to front plane 30 is around 1.28 inches. Thus, width 50 of first flange B is about 45% greater than width 72 of flange C. In general, width 50 of flange B may be around 20% greater than width 72 of flange C and more preferably is more than 35% greater.

Both mounting flanges B and C are integrally molded in one-piece with box A. Both flanges B and C are generally flat throughout their extent so as to have generally parallel opposite surfaces.

First flange B is positionable against the front surface of a vertical wall stud for receiving fasteners to attach box A to the stud. First flange B can be used for securing box A on either of opposite sides of the stud by rotating the box 180°. Second mounting flange C receives fasteners for attaching box A to the side surface of a vertical wall stud. Box A can be rotated 180° so that second mounting flange C can be attached to either of opposite sides of a wall stud.

Opposite sidewalls 12, 14 are provided with draft angles so that the sidewalls slope slightly toward one another in a direction from front plane 30 toward rear wall 20 as is apparent in FIG. 6. Thus, the outer surfaces of the sidewalls do not extend perpendicular to front plane 30, and front-to-back tapered ribs 80, 82 are provided on the side walls. The outer surfaces of ribs 80, 82 do extend generally perpendicular to front plane 30 so that when ribs 80 or 82 engage a stud sidewall, front opening 24 and front plane 30 will be parallel to the finished wall. Because of the draft angle, first mounting flange B does not extend exactly perpendicular to sidewall 14 but does extend generally perpendicular thereto. Likewise, second mounting flange C does not extend exactly parallel to sidewall 12 but extends generally parallel thereto. Inner and outer surfaces 64, 66 and 64a, 66a do extend perpendicular to front plane 30.

Projections 84, 86 extend outwardly from box sidewall 12 to provide abutment surfaces 84a, 86a that are aligned with front surfaces 54, 54a of second mounting bracket C. Abutment surfaces 84a, 86a engage a front surface of a vertical wall stud to position second mounting flange front surfaces 54, 54a generally in the same plane as the front surface of the wall stud.

Box top and bottom walls 16, 18 have bosses molded therein with fastener receiving holes 90, 92 for attaching an electrical switch or outlet within box A. Each sidewall, top wall and rear wall of box A includes a knockout arrangement generally indicated at D. All of the knockouts are the same and are formed by inner, intermediate and outer circular grooves 102, 104 and 106 molded into a box wall, but extending less than all of the way through the wall. The grooves provide weakened areas for removal of small, intermediate and large knockouts 108, 110 and 112. The circular grooves are eccentrically positioned and overlap one another at a tangent location generally indicated at 114 that is closely adjacent box rear wall 20.

Although the invention has been shown and described with reference to a representative embodiment, it is obvious that alterations and modifications will occur to others skilled in the art upon the reading and understanding of this application. Therefore, it is to be understood that the invention may be practiced otherwise than as specifically described herein while remaining within the scope of the claims.

We claim:

1. An electrical outlet box molded in one-piece of plastic material with alternative mounting flanges thereon, one of said flanges extending outwardly from one box sidewall generally perpendicular thereto for attaching the box to a front surface of a wall stud and the other of said flanges extending outwardly from an opposite box sidewall generally parallel thereto beyond the box endwalls for attaching the box to a side surface of a wall stud, the box lacking any structure for attachment to a side surface of a stud to which the box is attached by the one flange, and the box lacking any structure for attachment to a front surface of a stud to which the box is attached by the other flange.

2. The box of claim 1 wherein said box has a front opening with a front opening plane, said one flange having a rear flange surface facing away from said plane and said other flange having a front flange surface facing toward said plane, and both said rear flange surface and said front flange surface being spaced the same distance from said plane.

3. The box of claim 2 wherein said one flange has a flange thickness generally perpendicular to said plane and said other flange has a flange thickness generally parallel to said plane, and said flange thickness of said other flange being greater than said flange thickness of said one flange.

4. The box of claim 3 wherein said one flange has a flange width generally parallel to said plane and said other flange has a flange width generally perpendicular to said plane, and said flange width of said one flange being greater than said flange width of said other flange, said box having a rear wall and a front opening opposite from said rear wall with a front opening plane, the entire said other flange being spaced toward said front opening from said rear wall and being located closer to said front plane than to said rear wall.

5. The box of claim 1 wherein said box has a front opening with a front opening plane, said one flange having a flange thickness extending generally perpendicular to said plane and said other flange having a flange thickness generally parallel to said plane, and said flange thickness of said other flange being greater than said flange thickness of said one flange.

6. The box of claim 1 wherein said box has a front opening with a front opening plane, said one flange having a width generally parallel to said plane and said other flange having a width generally perpendicular to said plane, said flange width of said one flange being greater than said flange width of said other flange, said box having opposite endwalls extending generally perpendicular to said box sidewalls, and said one flange extending along said one box sidewall a distance less than the distance between said endwalls.

7. An electrical outlet box molded in one-piece of plastic material, said box having opposite sides and opposite ends, a mounting flange on each of said sides for mounting said box to a wall stud, one of said flanges extending outwardly from one of said sides generally perpendicular thereto, the other of said flanges extending outwardly from said ends generally parallel to the other of said sides on the opposite side of said box from said one side, and said other side being free of any mounting flange extending outwardly therefrom generally perpendicular thereto in a position to overlie a front surface of a wall stud when said other flange is attached to a side surface of a wall stud.

8. The box of claim 7 wherein said box has a front opening with a front opening plane, said one flange having a rear flange surface facing away from said plane and said other flange having a front flange surface facing toward said plane, and both said rear flange surface and said front flange surface being spaced the same distance from said plane.

9. The box of claim 8 wherein said one flange has a flange thickness generally perpendicular to said plane and said other flange has a flange thickness generally parallel to said plane, and said flange thickness of said other flange being greater than said flange thickness of said one flange.

10. The box of claim 7 wherein said one flange has a flange width generally parallel to said plane and said other flange has a flange width generally perpendicular to said plane, and said flange width of said one flange being greater than said flange width of said other flange.

11. The box of claim 7 wherein said box has a front opening with a front opening plane, said one flange having a flange thickness extending generally perpendicular to said plane and said other flange having a flange thickness generally parallel to said plane, and said flange thickness of said other flange being greater than said flange thickness of said one flange.

12. The box of claim 7 wherein said box has a rear wall and a front opening opposite from said rear wall with a front opening plane, said one flange having a width generally parallel to said plane and said other flange having a width generally perpendicular to said plane, and said flange width of said one flange being greater than said flange width of said other flange, the entire said other flange being spaced toward said front opening from said rear wall and being located closer to said front plane than to said rear wall.

13. An electrical outlet box molded in one-piece of plastic material, said box having opposite sidewalls, top and bottom walls, a rear wall and a front opening opposite from said rear wall, said front opening having an opening periphery that lies in a plane, a first mounting flange extending outwardly from one of said sidewalls generally perpendicular thereto and generally parallel to said plane for attaching said box to a front surface of a wall stud and being spaced toward said rear wall from said plane, a second mounting flange extending outwardly from the other of said sidewalls generally parallel thereto and generally perpendicular to said plane for attaching said box to a side surface of a wall stud and being spaced toward said rear wall from said plane, said second mounting flange extending outwardly beyond both said top and bottom walls, and said other sidewall being free of any mounting flange or any other flange extending outwardly therefrom generally perpendicular thereto in a position to overlie a front surface of a wall stud when said other flange is attached to a side surface of a wall stud.

14. The box of claim 13 wherein said one flange has a rear flange surface facing away from said plane and said other flange has a front flange surface facing toward said plane, and both said rear flange surface and said front flange surface being spaced the same distance from said plane.

15. The box of claim 14 wherein said one flange has a flange thickness generally perpendicular to said plane and said other flange has a flange thickness generally parallel to said plane, and said flange thickness of said other flange being greater than said flange thickness of said one flange.

16. The box of claim 15 wherein said one flange has a flange width generally parallel to said plane and said other flange has a flange width generally perpendicular to said plane, and said flange width of said one flange being greater than said flange width of said other flange.

17. The box of claim 13 wherein said one flange has a flange thickness extending generally perpendicular to said plane and said other flange has a flange thickness generally parallel to said plane, and said flange thickness of said other flange being greater than said flange thickness of said one flange.

18. The box of claim 13 wherein said one flange has a width generally parallel to said plane and said other flange has a width generally perpendicular to said plane, and said flange width of said one flange being greater than said flange width of said other flange.

19. An electrical outlet box molded in one-piece of plastic material with alternative mounting flanges thereon, one of said flanges extending generally perpendicular to one box sidewall for attaching the box to a front surface of a wall stud and the other of said flanges extending generally parallel to an opposite box sidewall on an opposite side of the box from said one flange for attaching the box to a side surface of a wall stud, said box having top and bottom walls and said other flange extending outwardly beyond both said top and bottom walls generally perpendicular thereto, said opposite box sidewall being free of any flange that overlies a front surface of a wall stud when said other flange is attached to a side surface of the wall stud, said box having a rear wall and a front opening opposite from said rear wall with a front opening plane, and the entire said other flange being spaced toward said front opening from said rear wall and being located closer to said front plane than to said rear wall.

20. An electrical outlet box molded in one-piece of plastic material, said box having opposite sides and opposite ends, a mounting flange on each of said opposite sides for mounting said box to a wall stud, one of said flanges extending outwardly from one of said sides generally perpendicular thereto, the other of said flanges extending outwardly from said ends generally parallel to the other of said sides on the opposite side of said box from said one side, and said other of said sides of said box being free of any flange that overlies a front surface of a wall stud when said other flange is attached to a side surface of the wall stud.

21. An electrical outlet box molded in one-piece of plastic material, said box having opposite sidewalls, top and bottom walls, a rear wall and a front opening opposite from said rear wall, said front opening having an opening periphery that lies in a plane, a first mounting flange extending outwardly from one of said sidewalls generally parallel to said plane and generally perpendicular to said one sidewall for attaching said box to a front surface of a wall stud and being spaced toward said rear wall from said plane, a second mounting flange extending outwardly from the other of said sidewalls generally perpendicular to said plane and generally parallel to said other sidewall for attaching said box to a side surface of a wall stud and being spaced toward said rear wall from said plane, said second mounting flange extending outwardly beyond both said top and bottom walls, and said other of said sidewalls being free of any flange that overlies a front surface of a wall stud when said second mounting flange is attached to the side surface of the wall stud, and the entire said other flange being spaced toward said front opening from said rear wall and being located closer to said front plane than to said rear wall.

* * * * *